(12) United States Patent
Choi et al.

(10) Patent No.: US 9,831,772 B1
(45) Date of Patent: Nov. 28, 2017

(54) RESONANT CONVERTER WITH SYNCHRONOUS RECTIFIER FEEDBACK

(71) Applicant: Marvell International LTD., Hamilton (BM)

(72) Inventors: Jinho Choi, Saratoga, CA (US); Young Chul Ryu, Cupertino, CA (US); Wanfeng Zhang, Palo Alto, CA (US); Chang Qian, Palo Alto, CA (US)

(73) Assignee: Marvell International LTD., Hamilton (BM)

( * ) Notice: Subject to any disclaimer, the term of this patent is extended or adjusted under 35 U.S.C. 154(b) by 48 days.

(21) Appl. No.: 14/644,846

(22) Filed: Mar. 11, 2015

Related U.S. Application Data

(60) Provisional application No. 61/954,454, filed on Mar. 17, 2014.

(51) Int. Cl.
*H02M 3/158* (2006.01)
*H02M 3/156* (2006.01)

(52) U.S. Cl.
CPC ............ *H02M 3/158* (2013.01); *H02M 3/156* (2013.01)

(58) Field of Classification Search
CPC .... H02M 3/158–3/1588; H02M 3/156; H02M 2001/0003
See application file for complete search history.

(56) References Cited

U.S. PATENT DOCUMENTS

| | | | |
|---|---|---|---|
| 9,532,418 B2* | 12/2016 | van den Broeke | H05B 33/0815 |
| 2011/0221415 A1* | 9/2011 | Otsuka | H02M 3/1588 323/283 |
| 2014/0139109 A1* | 5/2014 | Morales | H05B 33/0845 315/121 |

OTHER PUBLICATIONS

Analog Devices "Nonsychronous Step-Down Regulator ADP 2300 Datasheet". Revision C. Nov. 2012. pp. 1-28.*
Analog Devices. "AN—1083 Application Note"). Revision A. Sep. 2010. pp. 1-8.*

* cited by examiner

*Primary Examiner* — Harry Behm
*Assistant Examiner* — Peter Novak

(57) ABSTRACT

A system includes an inductance, a sensing circuit, a filter circuit, and a switch. The inductance includes a first terminal connected to (i) an output of a power supply supplying a DC voltage and (ii) a load, and a second terminal connected to a node. The sensing circuit is configured to sense voltage at the node. The filter circuit is configured to filter the voltage at the node, and output a filtered voltage. The switch is configured to communicate with the node, and control current through the load based on the filtered voltage.

6 Claims, 10 Drawing Sheets

RESONANT CONVERTER WITH SYNCHRONOUS RECTIFIER FEEDBACK

CROSS-REFERENCE TO RELATED APPLICATIONS

The present disclosure claims the benefit of U.S. Provisional Application No. 61/954,454, filed on Mar. 17, 2014. The entire disclosure of the application referenced above are incorporated herein by reference.

FIELD

The present disclosure relates generally to power supplies and more particularly to regulating current through a load without using a transformer.

BACKGROUND

Some power-supply driven loads (e.g., LED-based display systems) are isolated from a power supply by a transformer. To regulate current through a load that is isolated from a power supply by a transformer, data from a secondary side of the transformer is typically used. The data is generally obtained using a bias winding of the transformer.

SUMMARY

A system comprises an inductance, a sensing circuit, a filter circuit, and a switch. The inductance includes a first terminal connected to (i) an output of a power supply supplying a DC voltage and (ii) a load, and a second terminal connected to a node. The sensing circuit is configured to sense voltage at the node. The filter circuit is configured to filter the voltage at the node, and output a filtered voltage. The switch is configured to communicate with the node and to control current through the load based on the filtered voltage.

In another feature, the filter circuit includes a high-pass filter.

In another feature, the system further comprises a controller configured to control the switch based on the filtered voltage.

In another feature, the system further comprises a controller configured to generate a pulse width modulated signal to bias the switch and to adjust a duty cycle of the pulse width modulated signal based on the filtered voltage to control the current through the load.

In another feature, the sensing circuit includes a voltage divider connected across the node and a reference potential.

In still other features, a system comprises an inductance, a first sensing circuit, a second sensing circuit, and a switch. The inductance includes a first terminal connected to (i) an output of a power supply supplying a DC voltage and (ii) a load, and a second terminal connected to a node. The first sensing circuit is configured to sense a first voltage at the node. The second sensing circuit is configured to sense a supply voltage at the output of the power supply. The switch is configured to communicate with the node and to control current through the load based on the first voltage and the supply voltage.

In another feature, the system further comprises a comparator and a controller. The comparator is configured to compare the first voltage and the supply voltage. The controller is configured to control the switch based on the comparison of the first voltage and the supply voltage.

In another feature, the system further comprises a controller configured to generate a pulse width modulated signal to bias the switch and to control the current through the load by adjusting a duty cycle of the pulse width modulated signal based on a comparison of the first voltage and the supply voltage.

In another feature, the system further comprises a detection circuit and a controller. The detection circuit is configured to detect an output voltage across the load based on the first voltage and the supply voltage. The controller is configured to turn off the switch in response to the output voltage being greater than or equal to a predetermined voltage.

In other features, the first sensing circuit includes a first voltage divider connected across the node and a reference potential. The second sensing circuit includes a second voltage divider connected across the output of the power supply and the reference potential.

In still other features, a method comprises sensing voltage at a node connected to an inductance. The inductance includes a first terminal connected to (i) an output of a power supply supplying a DC voltage and (ii) a load, and a second terminal connected to a node. The method further comprises outputting a filtered voltage by filtering the voltage at the node. The method further comprises controlling current through the load based on the filtered voltage using a switch coupled to the node.

In another feature, the method further comprises filtering the voltage at the node using a high-pass filter.

In another feature, the method further comprises controlling the switch based on the filtered voltage.

In other features, the method further comprises generating a pulse width modulated signal to bias the switch and adjusting a duty cycle of the pulse width modulated signal based on the filtered voltage to control the current through the load.

In another feature, the method further comprises sensing the voltage at the node using a voltage divider connected across the node and a reference potential.

In still other features, a method comprises sensing a first voltage at a node connected to an inductance. The inductance includes a first terminal connected to (i) an output of a power supply supplying a DC voltage and (ii) a load, and a second terminal connected to the node. The method further comprises sensing a supply voltage at the output of the power supply. The method further comprises controlling current through the load based on the first voltage and the supply voltage using a switch coupled to the node.

In other features, the method further comprises comparing the first voltage and the supply voltage and controlling the switch based on the comparison of the first voltage and the supply voltage.

In other features, the method further comprises generating a pulse width modulated signal to bias the switch and controlling the current through the load by adjusting a duty cycle of the pulse width modulated signal based on a comparison of the first voltage and the supply voltage.

In other features, the method further comprises detecting an output voltage across the load based on the first voltage and the supply voltage, and turning off the switch in response to the output voltage being greater than or equal to a predetermined voltage.

In other features, the method further comprises sensing the first voltage at the node using a first voltage divider connected across the node and a reference potential, and sensing the supply voltage at the output of the power supply using a second voltage divider connected across the output of the power supply and the reference potential.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Nowadays the pressure on system designers to design compact and inexpensive LED-based display systems is increasing. The present disclosure relates to a transformer-less system to regulate load current. Eliminating the transformer can result in a compact system. Replacing the transformer with an off-the-shelf inductor can result in an inexpensive system. As explained below in detail, one way to eliminate the transformer is to replace the transformer, including a bias winding used to obtain secondary side data, by an off-the-shelf inductor; and to obtain the data for load regulation by using a high-pass filter. Another way is to replace the transformer by an off-the-shelf inductor and to obtain the data for load regulation using a direct detection method as explained below in detail. Further, the direct detection method can be used to provide over-voltage protection as explained below in detail. Before describing the systems and methods of the present disclosure, a brief explanation of current regulation equations follows.

Figure 1:
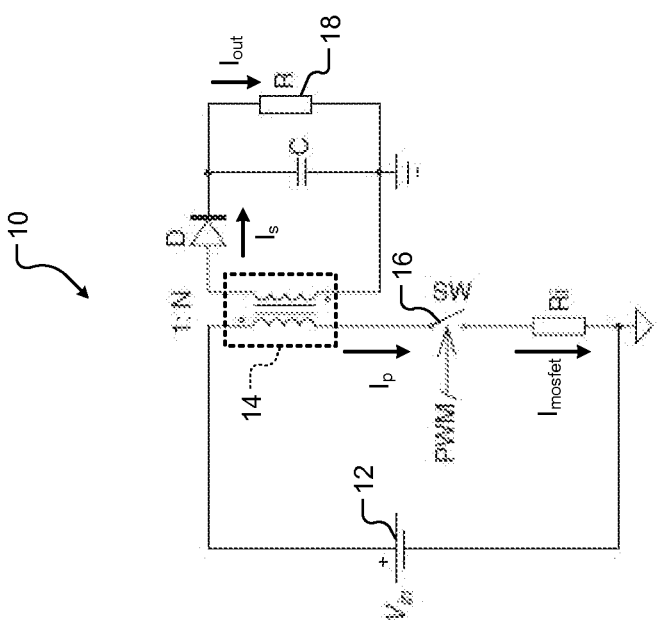
FIG. 1 is a schematic of a load regulation system.

FIG. 1 shows a schematic of a load regulation system 10. The system 10 includes a power supply 12, a transformer 14, and a switch 16 connected as shown. A load R 18 is connected across a secondary winding of the transformer 14. The switch 16 typically includes a MOSFET. The switch 16 is driven by a pulse width modulation signal generated by a pulse width modulation controller (not shown).

Figures 2, 3:
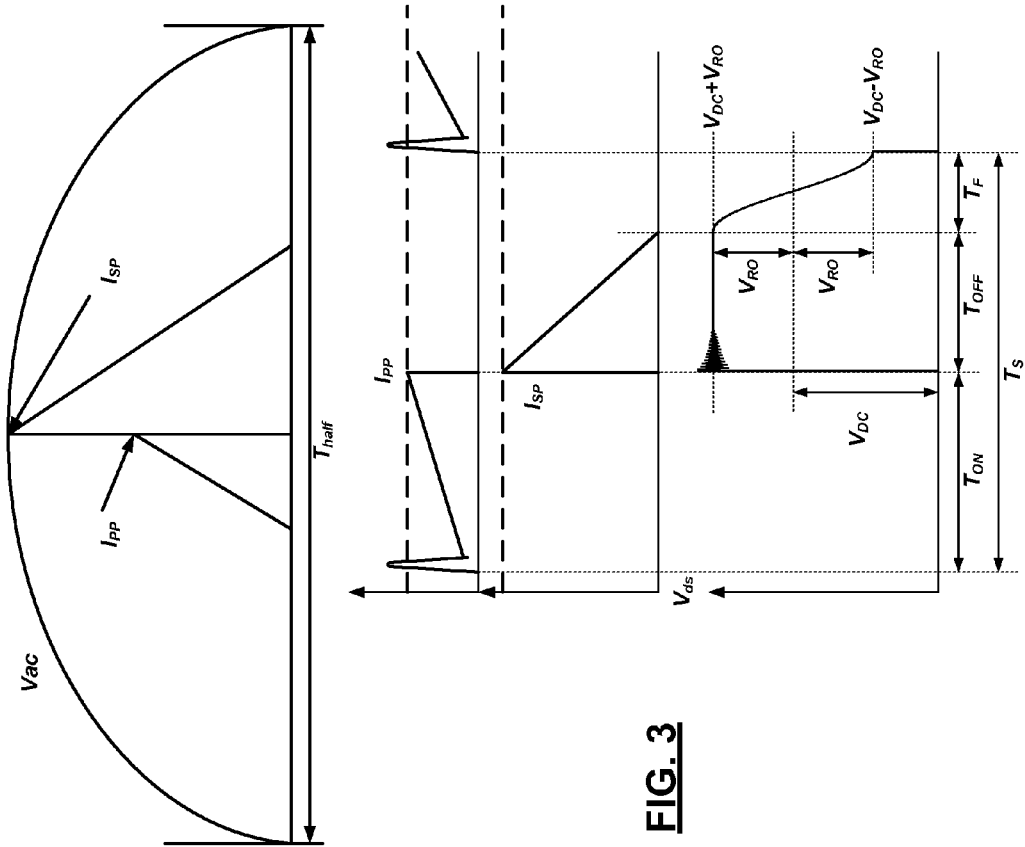
FIG. 2 depicts a half cycle of a rectified AC voltage along with peak values of primary and secondary currents in a transformer used in the load regulation system of FIG. 1.
FIG. 3 depicts peak primary and secondary currents and drain-to-source voltage of a switch used in load regulation system FIG. 1.

FIG. 2 shows a half cycle of a rectified AC voltage $V_{ac}$ supplied by the power supply 12. $T_{half}$ denotes a duration of the half cycle of the AC voltage $V_{ac}$. $I_{PP}$ and $I_{sp}$ respectively denote peak values of currents through the primary and secondary windings of the transformer 14.

FIG. 3 shows the peak currents through the primary and secondary windings of the transformer 14 along with a drain voltage $V_{ds}$ of the switch 16. The drain voltage $V_{ds}$ of the switch 16 includes a DC voltage $V_{DC}$ supplied by the power supply 12 (shown in FIG. 1 as a battery with a voltage $V_{in}$) and a reflected output voltage $V_{RO}$ across the load R 18. $T_{ON}$ and $T_{OFF}$ respectively denote the on and off times of the switch 16 according to a duty cycle of the pulse width modulation signal.

Figure 4:
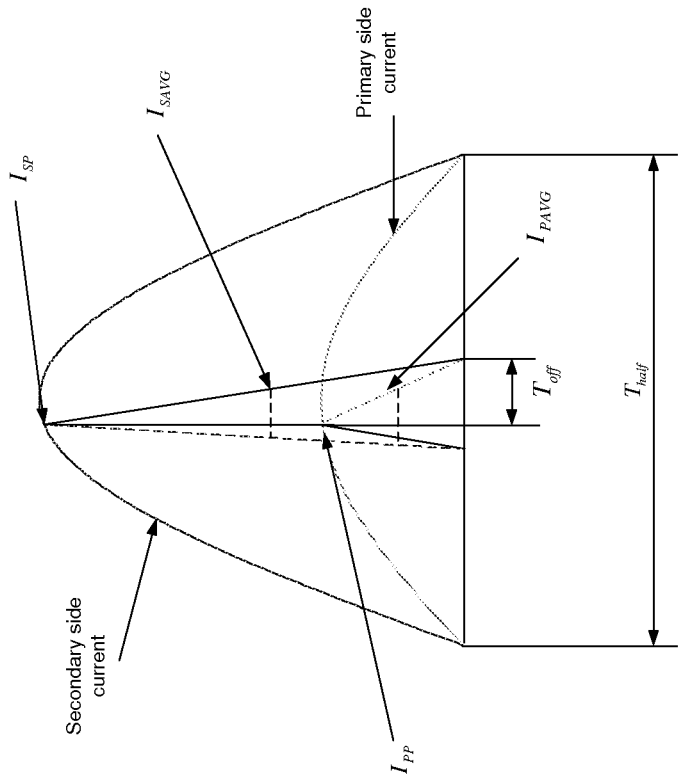
FIG. 4 depicts peak and average values of primary and secondary currents in a half cycle of a rectified AC voltage supplied by a power supply of the load regulation system FIG. 1.

FIG. 4 shows the peak and average values of the primary and secondary currents in a half cycle of the rectified AC voltage $V_{ac}$ supplied by the power supply 102. An average current $I_{avg}$ through the load R 18 is given as follows.

$$I_{avg} = \frac{\sum_{t=0}^{T_{half}} \frac{I_{sp}}{2} \times T_{off}}{T_{half}} =$$

$$\frac{\sum_{t=0}^{T_{half}} I_{savg} \times T_{off}}{T_{half}} = \frac{N \times \sum_{t=0}^{T_{half}} I_{pavg} \times T_{off}}{T_{half}} = N \times I_{pavg\_half}$$

$$\therefore I_{pavg\_half} = \frac{V_{ref}}{R}$$

$$R = \frac{V_{ref} \times N}{I_{avg}}$$

Accordingly, the average current calculation can be replaced by a sense resistor, which includes turn ratio information N of the transformer 14. For example, for an internal reference $V_{in}=1$ V, an average output current of 200 mA through the load, and a turn ratio N=5 of the transformer, the value of the sense resistor will be 1 Ohm.

Figure 5:
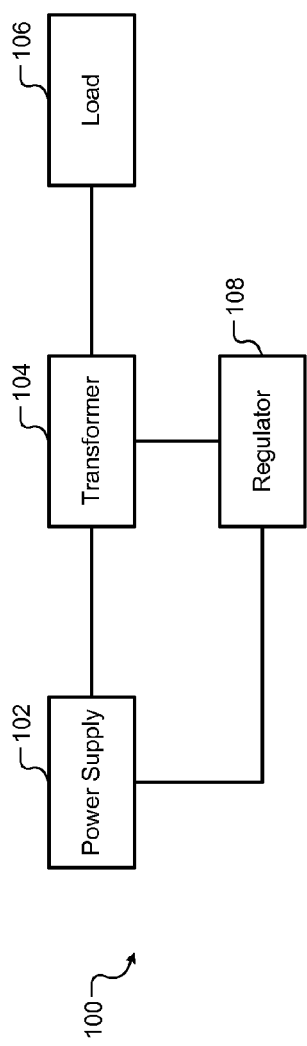
FIG. 5 is a functional block diagram of a system for regulating power supplied to a load using a transformer.

FIG. 5 shows a system 100 for regulating power supplied to a load using a transformer. The system 100 includes a power supply 102, a transformer 104, a load 106, and a regulator 108. The power supply 102 receives AC power (e.g., from a wall outlet) and converts the AC power into DC power. The transformer 104 isolates the load 106 from the power supply 102. The regulator 108 receives the DC power from the power supply 102, obtains data from the secondary side of the transformer 104 via a bias winding of the transformer 104, and regulates current through the load 106 as explained below in detail.

Figure 6:
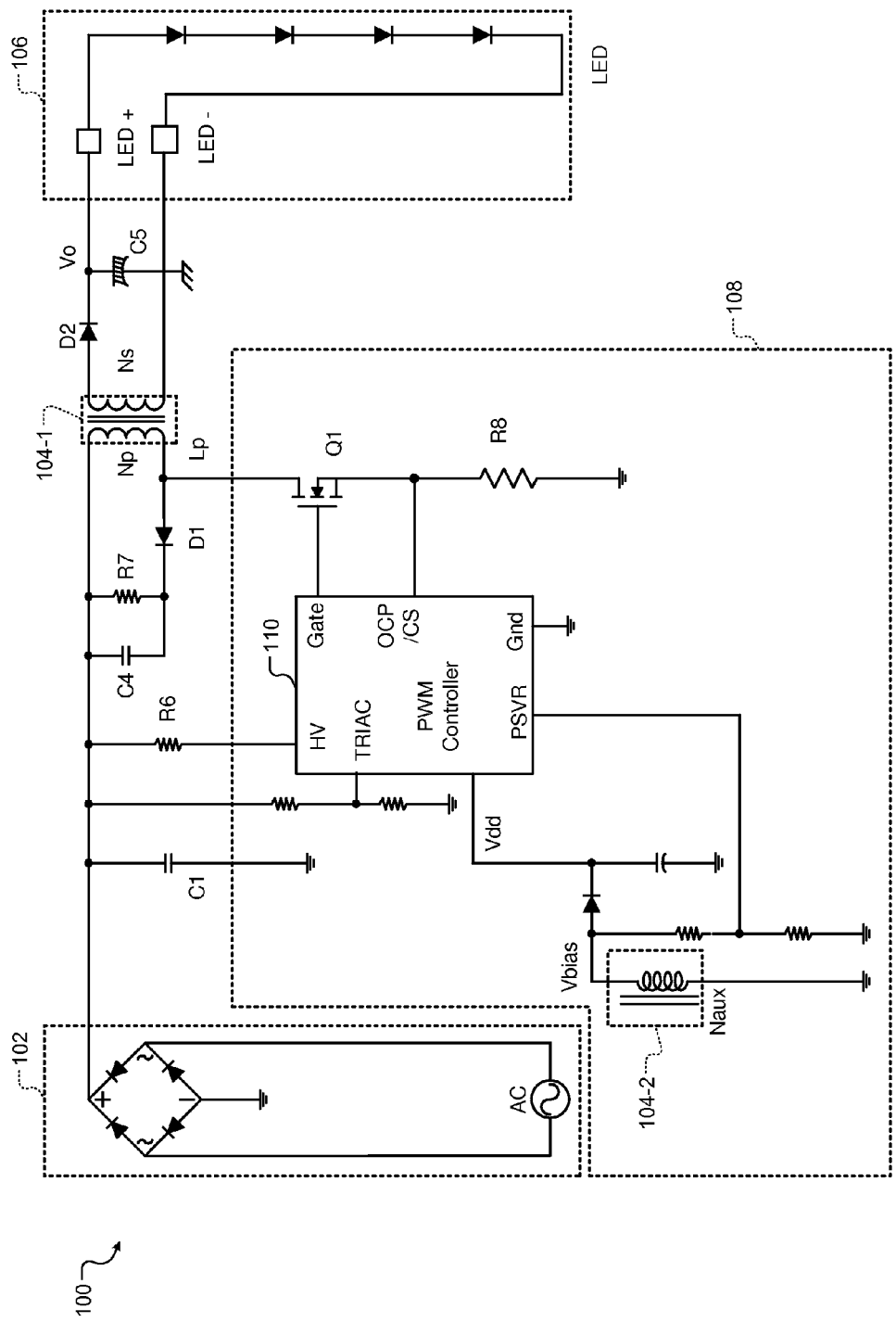
FIG. 6 is a schematic of an example of the system shown in FIG. 5.

FIG. 6 shows an example of the system 100. The power supply 102 includes a bridge rectifier that rectifies the AC voltage into DC voltage. The power supply 102 outputs the DC voltage. The transformer 104 includes primary and secondary windings shown at 104-1 and a bias winding shown at 104-2. The load 106 includes a string of LEDs connected in series. The load 106 is connected across the secondary winding of the transformer 104 as shown.

The regulator 108 includes a switch Q1 (e.g., a MOSFET) that is connected to the primary winding of the transformer 104. The bias winding of the transformer 104 provides secondary side information without directly sensing voltage or current from the secondary side of the transformer 104. A pulse width modulation controller 110 receives the secondary side information from the bias winding through an input shown as PSVR (primary side voltage regulation). Based on the secondary side information received from the bias winding, the pulse width modulation controller 110 regulates current through the load 106 by biasing the switch Q1 using a pulse width modulated signal. The pulse width modulation controller 110 regulates current through the load 106 by controlling a duty cycle of the pulse width modulated signal based on the secondary side information received from the bias winding. The pulse width modulation controller 110 can also provide overcurrent protection/current sensing (OCP/CS) based on the secondary side information received from the bias winding.

Figure 7:
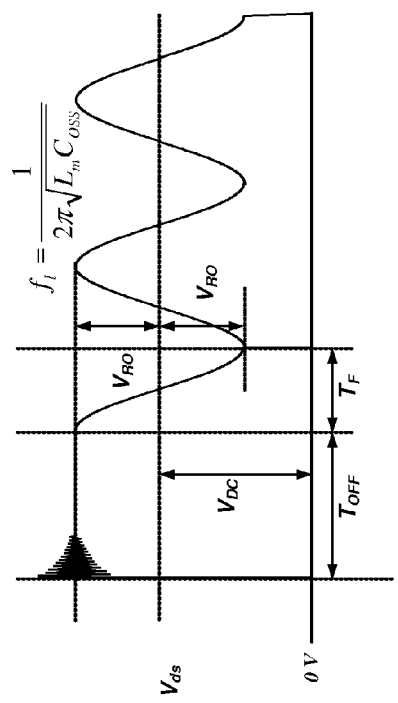
FIG. 7 depicts a waveform of a drain voltage at a switch Q1 shown in FIG. 6.
Figure 8:
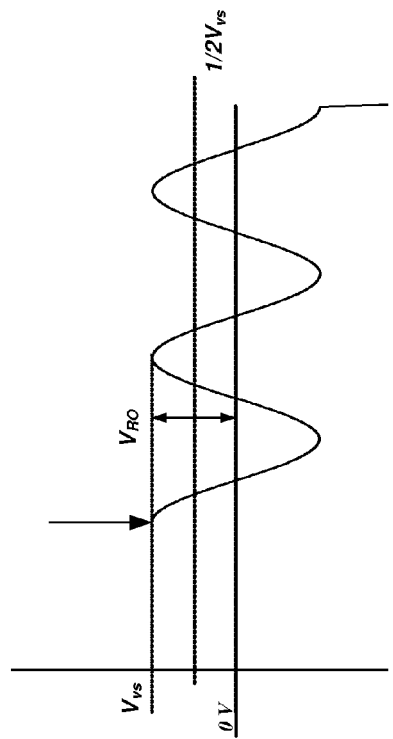
FIG. 8 depicts a waveform obtained from a voltage divider connected across the bias winding of the transformer shown in FIG. 6.

FIG. 7 shows a waveform of a drain voltage of the switch Q1 shown in FIG. 6. The DC voltage level $V_{DC}$ of the power supply in the drain voltage is unnecessary for load regulation. A reflected output voltage $V_{RO}$ in the drain voltage is used for load regulation. FIG. 8 shows a waveform obtained from a voltage divider connected across the bias winding of the transformer 104 shown in FIG. 6. The waveform provides information about the reflected output voltage $V_{RO}$.

Figure 9:
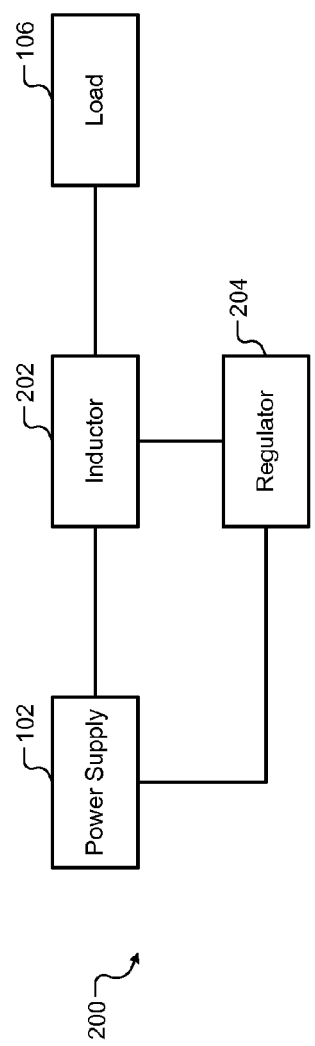
FIG. 9 is a functional block diagram of a system for regulating power supplied to a load using an inductor and a high-pass filter instead of a transformer.

FIG. 9 shows a system 200 for regulating power supplied to a load using an inductor and a high-pass filter instead of using a transformer. The system 200 includes the power supply 102, an inductor 202, the load 106, and a regulator 204. The power supply 102 receives AC power (e.g., from a wall outlet) and converts the AC power into DC power. As explained below in detail, the regulator 204 receives the DC power from the power supply 102, obtains data about the output voltage across the load 106 using a high-pass filter instead of using a bias winding of a transformer, and regulates current through the load 106. The regulator 204 eliminates the transformer and allows use of an off-the-shelf, inexpensive inductor 202 instead of the transformer 104. The inductor 202 is not a transformer. Rather, the inductor 202 replaces the transformer 104. The inductor 202 is directly connected to the DC output of the power supply 102. The inductor 202 is directly connected to the load 106.

Figure 10:
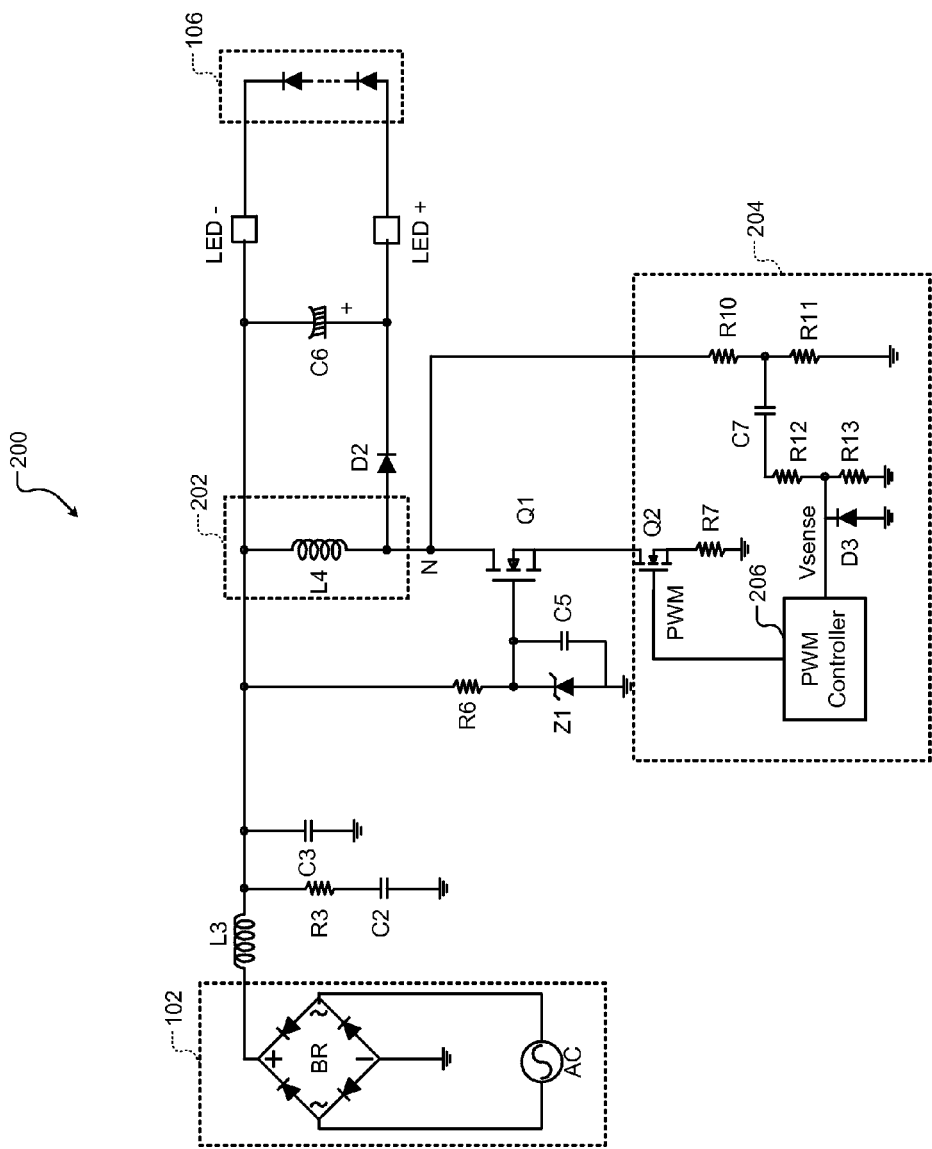
FIG. 10 is a schematic of an example of the system shown in FIG. 9.

FIG. 10 shows an example of the system 200. The power supply 102 includes the bridge rectifier that rectifies the AC voltage into DC voltage. The power supply 102 outputs the DC voltage. The inductor 202 is connected across an output of the power supply 102 and a node N as shown. Specifically, the inductor 202 has a first terminal and a second terminal. The first terminal of the inductor 202 is connected to the output of the power supply 102 as shown. For example, the first terminal of the inductor 202 is connected to the output of the rectifier of the power supply 102 as shown. Accordingly, the first terminal of the inductor 202 receives the DC voltage output by the power supply 102. The second terminal of the inductor 202 is connected to the node N. The load 106 includes a string of LEDs connected in series. The load 106 is connected across the inductor 202 and the node N as shown. The first terminal of the inductor 202 is directly connected to the load 106 as shown.

The regulator 204 includes a switch Q2 (e.g., a MOSFET) that is connected to the inductor 202 through the node N as shown. A voltage divider including resistors R10 and R11 is connected across the node N and a reference potential. The voltage divider senses an output voltage across the load 106 by sensing the voltage at the node N. A high-pass filter including resistors R12 and R13 and a capacitor C7 is connected to the voltage divider as shown. The high-pass filter replaces the bias winding of the transformer 104 shown in FIG. 6. The voltage at the node N resembles the waveform shown in FIG. 7. The high-pass filter filters the voltage sensed by the voltage divider. The output of the high-pass filter resembles the waveform shown in FIG. 8. The output of the high-pass filter represents the output voltage across the load 106.

A pulse width modulation controller 206 regulates current through the load 106 by biasing the switch Q2 using a pulse width modulated signal. The pulse width modulation controller 206 regulates the current through the load 106 by controlling a duty cycle of the pulse width modulated signal based on the output of the high-pass filter. In some implementations, the pulse width modulation controller 206 may be implemented by a module, which is defined below.

Figure 11:
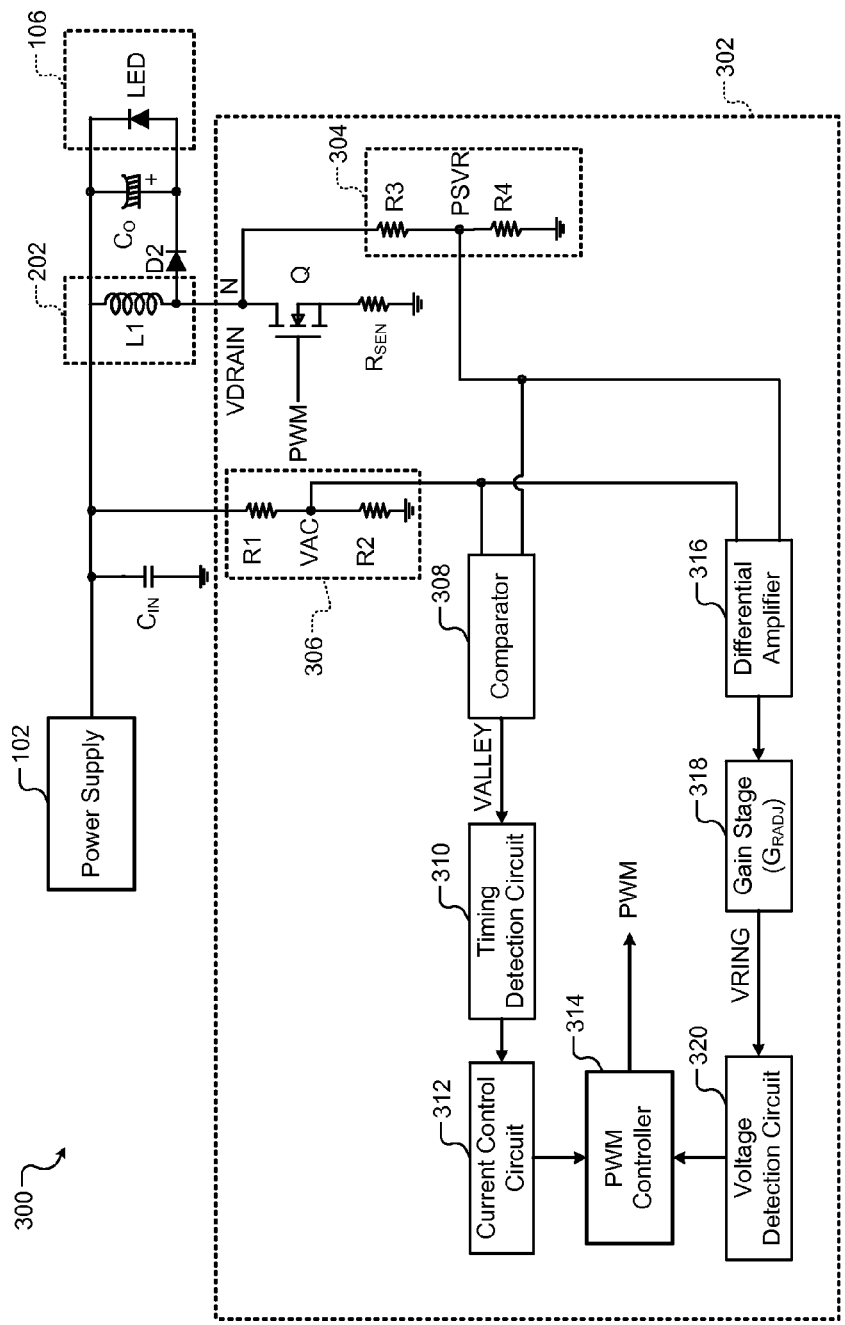
FIG. 11 is a schematic of a system that uses direct sensing to obtain data for load regulation and to provide over-voltage protection.

FIG. 11 shows a system 300 that obtains data for load regulation and that provides over-voltage protection using a direct detection method. The system 300 includes the power supply 102, the inductor 202 instead of the transformer 104, the load 106, and a regulator 302. The power supply 102 includes the bridge rectifier that rectifies the AC voltage into DC voltage. The power supply 102 outputs the DC voltage. The inductor 202 is connected across an output of the power supply 102 and a node N as shown. Specifically, the inductor 202 has a first terminal and a second terminal. The first terminal of the inductor 202 is connected to the output of the power supply 102 as shown. For example, the first terminal of the inductor 202 is connected to the output of the rectifier of the power supply 102 as shown. Accordingly, the first terminal of the inductor 202 receives the DC voltage output by the power supply 102. The second terminal of the inductor 202 is connected to the node N. The load 106 includes a string of LEDs connected in series. The load 106 is connected across the inductor 202 and the node N as shown. The first terminal of the inductor 202 is directly connected to the load 106 as shown.

The regulator 302 includes a switch Q (e.g., a MOSFET) that is connected to the inductor 202 through the node N as shown. The regulator 302 includes a first sensing circuit 304, a second sensing circuit 306, a comparator 308, a timing detection circuit 310, a current control circuit 312, a pulse width modulation controller 314, a differential amplifier 316, a gain stage 318, and a voltage detection circuit 320.

Figure 12:
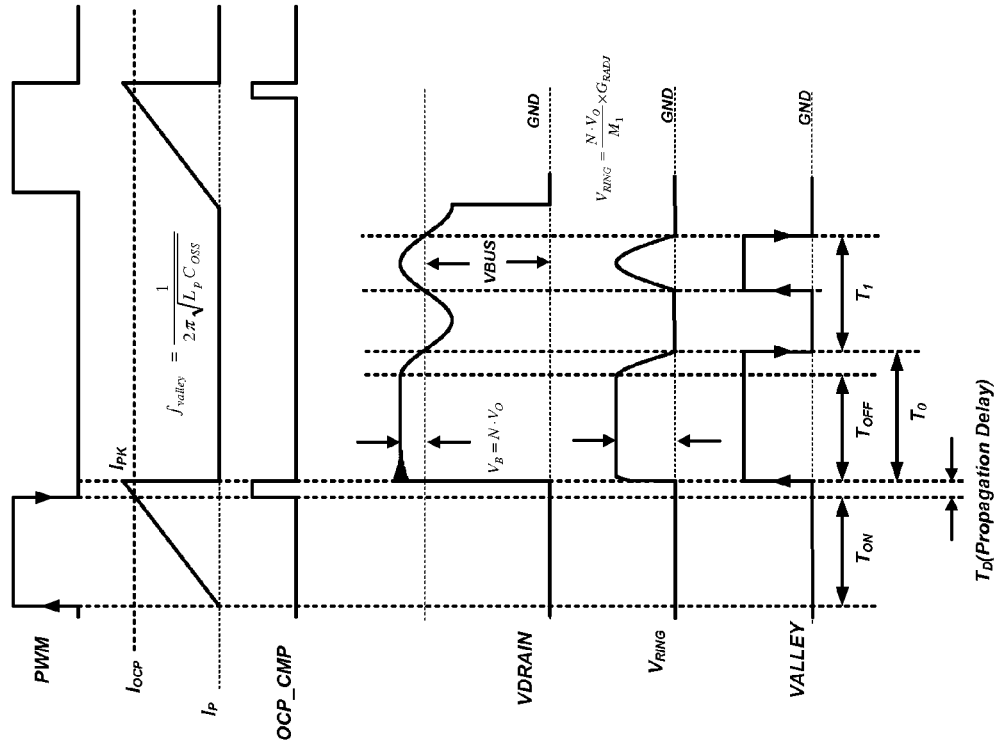
FIG. 12 depicts waveforms of various voltages and currents of FIG. 11.

FIG. 12 shows waveforms of various voltages and currents of FIG. 11. The waveforms include a pulse width modulation signal generated by the pulse width modulation controller 314, the voltage at the node N (shown as VDRAIN), a voltage $V_{RING}$ of a resonant ringing signal generated due to magnetization of the inductor 202 and a parasitic capacitance of the switch Q, and a signal VALLEY generated by the comparator 308.

The first sensing circuit 304 comprises a first voltage divider including resistors R3 and R4 connected across the node N and a reference potential. The first sensing circuit 304 senses the drain voltage of the switch Q at the node N. The second sensing circuit 306 comprises a second voltage divider including resistors R1 and R2 connected across the output of the power supply 102 and the reference potential. The second sensing circuit 306 senses the output voltage of the power supply 102.

The comparator 308 compares the voltage at the node N sensed by the first sensing circuit 304 and the output voltage of the power supply 102 sensed by the second sensing circuit 306. The timing detection circuit 310 determines $T_{OFF}$ based on the output of the comparator 308. In FIG. 12, $T_{OFF}=T_0-T_1/4$. The current control circuit 312 outputs a signal based on which the pulse width modulation controller 314 controls a duty cycle of a pulse width modulation signal used to drive the switch Q. Accordingly, the pulse width modulation controller 314 controls the current through the load 106 based on the output of the comparator 308 and the $T_{OFF}$ determination. In FIG. 12, the load current is given by $I_{PK}=I_{OCP}*((T_{ON}+T_D)/T_{ON})$, where $I_{OCP}$ is a predetermined overcurrent protection threshold, and $T_D$ denotes propagation delay.

The system 300 can also detect the output voltage across the load 106 and provide overvoltage protection as follows. The differential amplifier 316 receives the outputs of the first sensing circuit 304 and the second sensing circuit 306. The gain stage 318 further amplifies the output of the differential amplifier 316. The output of the gain stage 318 is $V_{RING}$ shown in FIG. 12, which represents the output voltage across the load 106. The voltage detection circuit 320 detects the output voltage across the load 106 based on $V_{RING}$.

The pulse width modulation controller 314 can compare the detected output voltage across the load 106 to a predetermined overvoltage protection threshold. The pulse width modulation controller 314 can adjust the duty cycle of the pulse width modulation signal that drives the switch Q based on the comparison. For example, the pulse width modulation controller 314 can turn off the switch Q when the detected output voltage across the load 106 is greater than or equal to the predetermined overvoltage protection threshold. In some implementations, one or more of the comparator 308, the timing detection circuit 310, the current control circuit 312, the pulse width modulation controller 314, and the voltage detection circuit 320 may be implemented by one or more modules (see definition of a module below).

Figure 13:
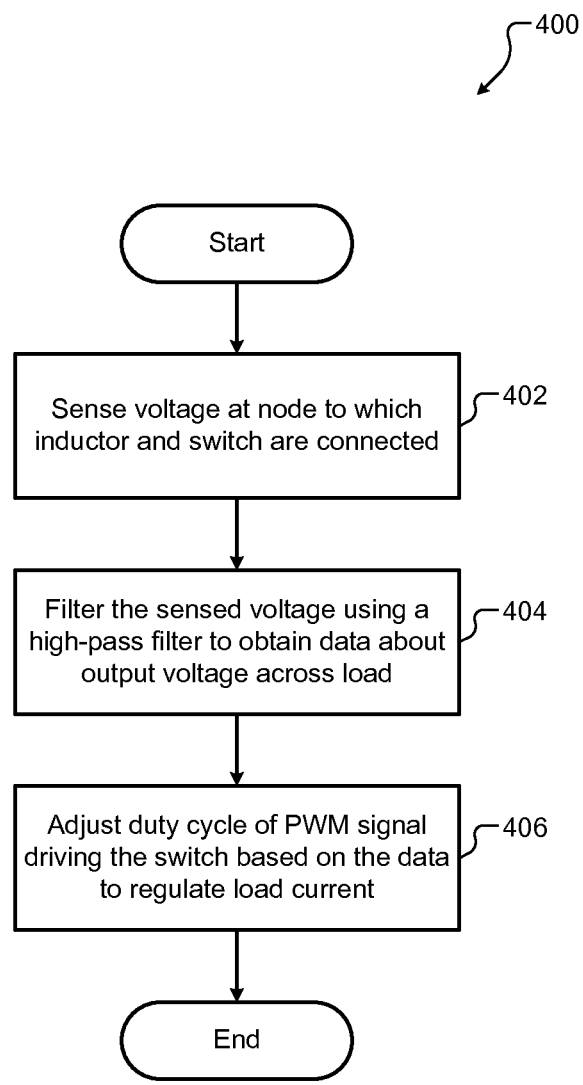
FIG. 13 is a flowchart of a method for regulating load current using a single inductor and a high-pass filter instead of using a transformer with a bias winding.

FIG. 13 shows a method 400 for regulating load current using a single inductor instead of a transformer and using a high-pass filter instead of a bias winding of the transformer. At 402, a voltage at a node, to which the inductor and a switch are connected, is sensed. At 404, the sensed voltage is filtered using a high-pass filter to obtain data about an output voltage across a load, which is connected across the inductor. At 406, a duty cycle of a pulse width modulation signal driving the switch is adjusted based on the data to regulate load current.

Figure 14:
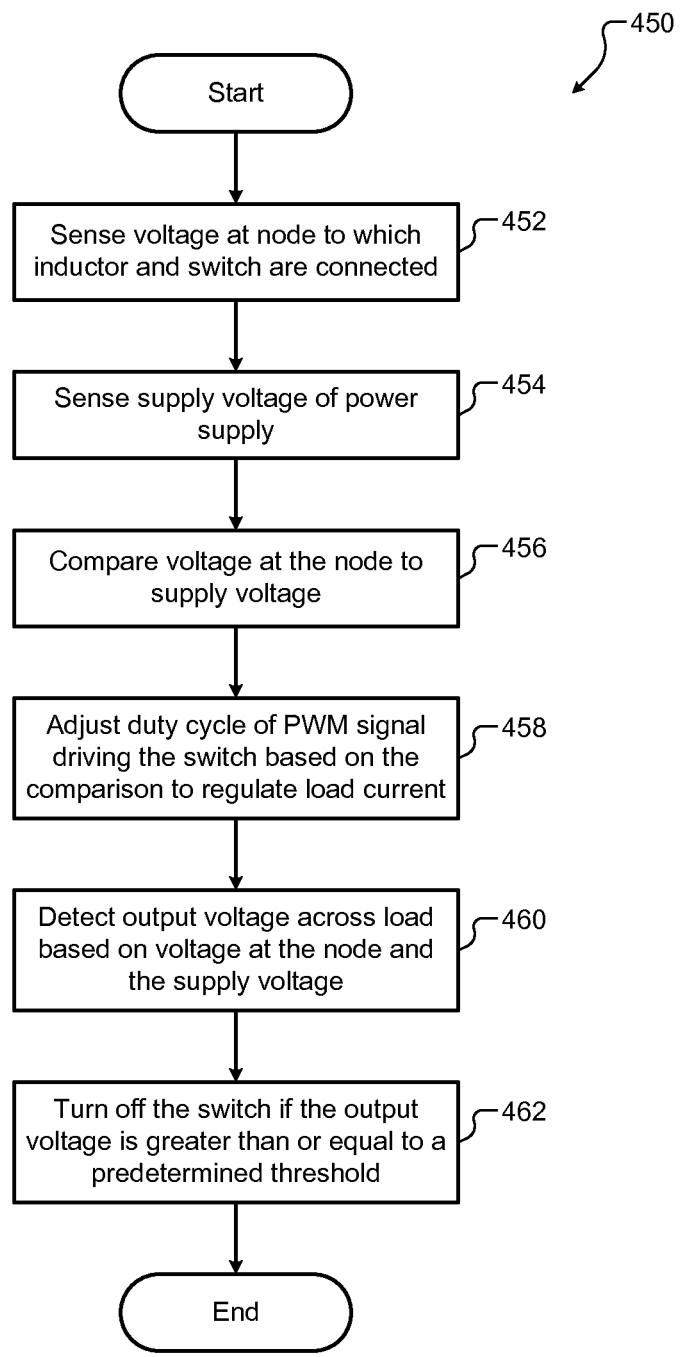
FIG. 14 is a flowchart of a method for regulating load current and providing overvoltage protection using direct sensing.

FIG. 14 shows a method 450 for regulating load current and providing overvoltage protection using direct sensing. At 452, a voltage at a node, to which the inductor and a switch are connected, is sensed. At 454, a supply voltage of the power supply is sensed. At 456, the voltage at the node is compared to the supply voltage. At 458, a duty cycle of a pulse width modulation signal driving the switch is adjusted based on the comparison to regulate load current. At 460, an output voltage across the load is detected based on the voltage at the node and the supply voltage. At 462, the switch is turned off if the detected output voltage across the load is greater than or equal to a predetermined threshold to provide overvoltage protection for the load.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Smalltalk, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A system comprising:
   an inductor including a first terminal connected to (i) an output of a power supply supplying a DC voltage and (ii) a load, and a second terminal connected to a node;
   a first voltage divider connected across the node and a ground terminal;
   a first capacitor including a first terminal connected to the first voltage divider, and a second terminal;
   a second voltage divider connected across the second terminal of the first capacitor and the ground terminal;
   a controller including an input terminal connected to the second voltage divider and an output terminal to output a pulse width modulated signal;
   a first switch including a control terminal connected to the output terminal of the controller, a first terminal communicating with the ground terminal, and a second terminal;
   a second switch including a first terminal connected to the second terminal of the first switch, a second terminal connected to the node, and a control terminal; and
   a resistor and a Zener diode connected in series across the output of the power supply and the ground terminal, a junction of the resistor and the Zener diode being connected to the control terminal of the second switch.

2. The system of claim 1, wherein:
   the first voltage divider senses voltage at the node; and
   the second voltage divider and the first capacitor filter the voltage at the node and output a filtered voltage; and
   the controller is configured to:
   generate the pulse width modulated signal to bias the first switch; and
   adjust a duty cycle of the pulse width modulated signal based on the filtered voltage to control current through the load.

3. A system comprising:
   an inductor including a first terminal connected directly to (i) an output of a power supply supplying a DC voltage and (ii) a load, and a second terminal connected to a node;
   a transistor including a first terminal connected to the node, a second terminal communicating with a ground terminal, and a control terminal;
   a first sensing circuit configured to sense a first voltage at the node;
   a second sensing circuit configured to sense a supply voltage at the output of the power supply;
   a comparator configured to compare the supply voltage to the first voltage at the node connected to the first terminal of the transistor and the second terminal of the inductor, and to generate a valley current mode control output; and
   a controller configured to output a pulse width modulated signal to the control terminal of the transistor based on the valley current mode control output.

4. The system of claim 3, wherein the controller is configured to:
   control current through the load by adjusting a duty cycle of the pulse width modulated signal based on the comparison of the first voltage and the supply voltage.

5. The system of claim 3, further comprising:
   a detection circuit configured to detect an output voltage across the load based on the first voltage and the supply voltage,
   wherein the controller is configured to turn off the transistor in response to the output voltage being greater than or equal to a predetermined voltage.

6. The system of claim 3, wherein the load includes a light emitting diode, the system further comprising:
   a capacitor including a positive terminal connected to anode of the light emitting diode, and a negative terminal connected to cathode of the light emitting diode and to the first terminal of the inductor; and
   a diode including anode connected to the node and cathode connected to the positive terminal of the capacitor.

* * * * *